US011159091B2

(12) United States Patent
Divan et al.

(10) Patent No.: US 11,159,091 B2
(45) Date of Patent: Oct. 26, 2021

(54) STACKABLE ISOLATED VOLTAGE OPTIMIZATION MODULE

(71) Applicant: Georgia Tech Research Corporation, Atlanta, GA (US)

(72) Inventors: Deepakraj M. Divan, Atlanta, GA (US); Rajendra Prasad Kandula, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 318 days.

(21) Appl. No.: 16/302,399

(22) PCT Filed: May 17, 2017

(86) PCT No.: PCT/US2017/033174
§ 371 (c)(1),
(2) Date: Nov. 16, 2018

(87) PCT Pub. No.: WO2017/201202
PCT Pub. Date: Nov. 23, 2017

(65) Prior Publication Data
US 2020/0321882 A1    Oct. 8, 2020

Related U.S. Application Data

(60) Provisional application No. 62/337,535, filed on May 17, 2016.

(51) Int. Cl.
*H02M 5/12* (2006.01)
*H02M 1/42* (2007.01)
(Continued)

(52) U.S. Cl.
CPC ............... *H02M 5/12* (2013.01); *H02J 3/26* (2013.01); *H02M 1/4216* (2013.01); *G05F 1/13* (2013.01); *Y02E 40/50* (2013.01)

(58) Field of Classification Search
CPC ............ H02M 5/10; H02M 5/12; H02M 5/14; H02M 1/045; H02M 1/082; H02M 1/084;
(Continued)

(56) References Cited

U.S. PATENT DOCUMENTS 4,583,068 A * 4/1986 Dickens ................. H01F 19/04
336/195
5,461,300 A * 10/1995 Kappenman ............. G05F 5/00
323/215
(Continued)

FOREIGN PATENT DOCUMENTS

DE          69414420 T2     5/1999
EP          0932168 A2      7/1999
(Continued)

OTHER PUBLICATIONS

International Search Report for PCT/US2017/033174 dated Aug. 4, 2017.
(Continued)

*Primary Examiner* — Thienvu V Tran
*Assistant Examiner* — Shahzeb K Ahmad
(74) *Attorney, Agent, or Firm* — Thomas | Horstemeyer, LLP

(57) ABSTRACT

Various examples are provided for isolated voltage optimization and control. In one example, a stackable isolated voltage optimization module (SIVOM) includes a transformer having a turns ratio between a primary winding and a secondary winding; a switching circuit configured to energize the secondary winding with a voltage provided from the three-phase power system or short the secondary winding; and a connection block configured to couple the switching circuitry to the first phase and a neutral, or to second and third phases of the three-phase power system. In another example, a system includes a SIVOM coupled to
(Continued)

each phase of a three-phase power system, where each SIVOM comprises: a transformer and a switching circuit configured to boost or buck a voltage or change a phase angle of the phase coupled to that SIVOM by energizing a secondary winding of the transformer with a voltage provided from the three-phase power system.

20 Claims, 10 Drawing Sheets

(51) Int. Cl.
*H02J 3/26* (2006.01)
*G05F 1/13* (2006.01)

(58) Field of Classification Search
CPC .... H02M 1/06; H02M 1/4216; H02M 1/4225; H02J 3/1814; H02J 3/26; H02J 11/00; Y02E 40/10; Y02E 40/50; G05F 1/13
See application file for complete search history.

(56) References Cited

U.S. PATENT DOCUMENTS

| | | | |
|---|---|---|---|
| 6,087,916 A | 7/2000 | Kutkut et al. | |
| 6,118,676 A | 9/2000 | Divan et al. | |
| 6,232,742 B1* | 5/2001 | Wacknov | H02M 3/1563 318/774 |
| 6,642,827 B1 | 11/2003 | McWilliams et al. | |
| 7,791,321 B2* | 9/2010 | Xu | H02M 3/1584 323/272 |
| 9,236,755 B2* | 1/2016 | Chang | B60L 53/22 |
| 2003/0011348 A1* | 1/2003 | Lof | F03D 9/257 322/37 |
| 2009/0129124 A1* | 5/2009 | Ranstad | H02M 7/10 363/17 |
| 2013/0020989 A1* | 1/2013 | Xia | H02M 7/2176 320/109 |
| 2014/0153144 A1* | 6/2014 | Lacey | H02H 1/0007 361/45 |
| 2014/0319910 A1* | 10/2014 | Divan | H02J 3/1878 307/20 |
| 2015/0365003 A1* | 12/2015 | Sadwick | H02M 3/28 363/21.01 |

FOREIGN PATENT DOCUMENTS

| | | |
|---|---|---|
| EP | 1668756 A2 | 6/2006 |
| WO | 2012120703 A1 | 9/2012 |
| WO | 2013153075 A2 | 10/2013 |
| WO | 2014035881 A1 | 3/2014 |

OTHER PUBLICATIONS

EP Office Action for application No. 17 800 118.6-1202, dated Feb. 2, 2021.

* cited by examiner

STACKABLE ISOLATED VOLTAGE OPTIMIZATION MODULE

CROSS REFERENCE TO RELATED APPLICATIONS

This application is the 35 U.S.C. § 371 national stage application of PCT Application No. PCT/US2017/033174, filed May 17, 2017, which claims priority to, and the benefit of, U.S. provisional application entitled "Stackable Isolated Voltage Optimization Module" having Ser. No. 62/337,535, filed May 17, 2016, both of which are hereby incorporated by reference in their entireties.

BACKGROUND

Precise control of the voltage at the grid edge can provide many benefits. In meshed grid applications, it can provide balanced loading of transformers and circuits. This can allow improved asset utilization and can significantly defer new asset build, which can be very expensive. In radial applications, it can provide precise control of voltage delivered to loads, allowing precise control of power and energy delivered to the load. For many industrial and commercial loads, such precise control of edge voltage can be the basis for reducing energy consumption and peak demand charges.

Transformers with tapped windings using electromechanical switching have been the most commonly used solution. This solution suffers from slow response and limited life for the switching contacts. Series connected transformers can be used to inject voltage in the line to provide the precise regulation needed. The injected voltage can be controlled using taps or a power converter. Grid faults can cause high short circuit currents which can impress high stress on the series transformer, and makes the design challenging and expensive. Shunt VAR sources can be used to provide local voltage control that is limited and not dispatchable as the level of control depends on the load current, power factor, service transformer impedance and injected VARs.

SUMMARY

Aspects of the present disclosure are related to isolated voltage optimization and control. Stackable isolated voltage optimization modules (SIVOM) can be used to control voltage and/or power flow in a wide range of applications.

In one aspect, among others, a stackable isolated voltage optimization module (SIVOM) comprises a transformer having a turns ratio between a primary winding and a secondary winding of the transformer, where the primary winding is configured to be supplied by first phase of a three-phase power system; a switching circuit configured to energize the secondary winding with a voltage provided from the three-phase power system or short the secondary winding; and a connection block configured to couple the switching circuitry to the first phase and a neutral of the three-phase power system, or to second and third phases of the three-phase power system. In one or more aspects, energizing the secondary winding with a voltage from the first phase and the neutral of the three-phase power system can boost or buck the voltage of the first phase without affecting phase angle of the first phase. The voltage boost or buck can be based upon the turns ratio of the transformer and a polarity of the connection to the second and third phases of the three-phase power system. In one or more aspects, energizing the secondary winding with a voltage from the second and third phases of the three-phase power system can adjust power flow by changing a phase angle of the first phase. The voltage from the second and third phases can be 90 degrees out of phase with a voltage of the first phase.

In one or more aspects, the transformer can be a coaxial winding transformer (CWT). The primary winding of the CWT can comprise an oval-shaped split tube configured to be connected to the first phase, and turns of the secondary winding are disposed in the oval-shaped split tube. In one or more aspects, the transformer can be a toroidal transformer (TT) with the primary winding comprising a main conductor passing through a toroidal core and the secondary winding comprising turns wrapped around the toroidal core. The switching circuit can comprise thyristors in a bridge configuration. In one or more aspects, the SIVOM can further comprise a controller configured to control switching of the switching circuitry to energize the secondary winding. The controller can be further configured to control switching of the connection block to couple the switching circuitry to the first phase and neutral of the three-phase power system, or to second and third phases of the three-phase power system.

In another aspect, a system comprises a stackable isolated voltage optimization module (SIVOM) coupled to each phase of a three-phase power system, where each SIVOM comprises: a transformer comprising a primary winding supplied by the phase coupled to that SIVOM; a switching circuit configured to boost or buck a voltage or change a phase angle of the phase coupled to that SIVOM by energizing a secondary winding of the transformer with a voltage provided from the three-phase power system. In one or more aspects, the switching circuit can be coupled to the phase supplying the primary winding and a neutral of the three-phase power system to boost or buck the voltage of that phase. The switching circuit can be coupled to the opposing phases of the three-phase power system that are not supplying the primary winding to change the phase angle of the phase supplying the primary winding. The transformer can be a coaxial winding transformer (CWT) or a toroidal transformer (TT). The CWT can comprise an oval-shaped split copper tube forming the primary winding, where the secondary winding comprises a multi-turn winding surrounded by the oval-shaped split copper tube.

In one or more aspects, the system can further comprise another SIVOM coupled to each phase of the three-phase power system, wherein one of the SIVOM of each phase boosts or bucks the voltage and the other SIVOM adjusts the phase angle. The system can comprise a plurality of stacked SIVOMs coupled to each phase of the three-phase power system, wherein the plurality of stacked SIVOMs are configured to cumulatively boost or buck the voltage or change the phase angle of the phase coupled to the plurality of stacked SIVOMs. The system can further comprise a master controller configured to maintain output voltages of the plurality of stacked SIVOMs coupled to each phase of the three-phase power system by individually controlling operation of the stacked SIVOMs. The three-phase power system can be an output of a transformer supplying industrial loads. The three-phase power system can be an output of a transformer supplying a meshed grid.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims. In addition, all optional and preferred features and modifications of the described embodiments are usable in all aspects of the disclosure taught herein. Furthermore, the individual features of the dependent claims, as well as all optional and preferred features and modifications of the described embodiments are combinable and interchangeable with one another.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
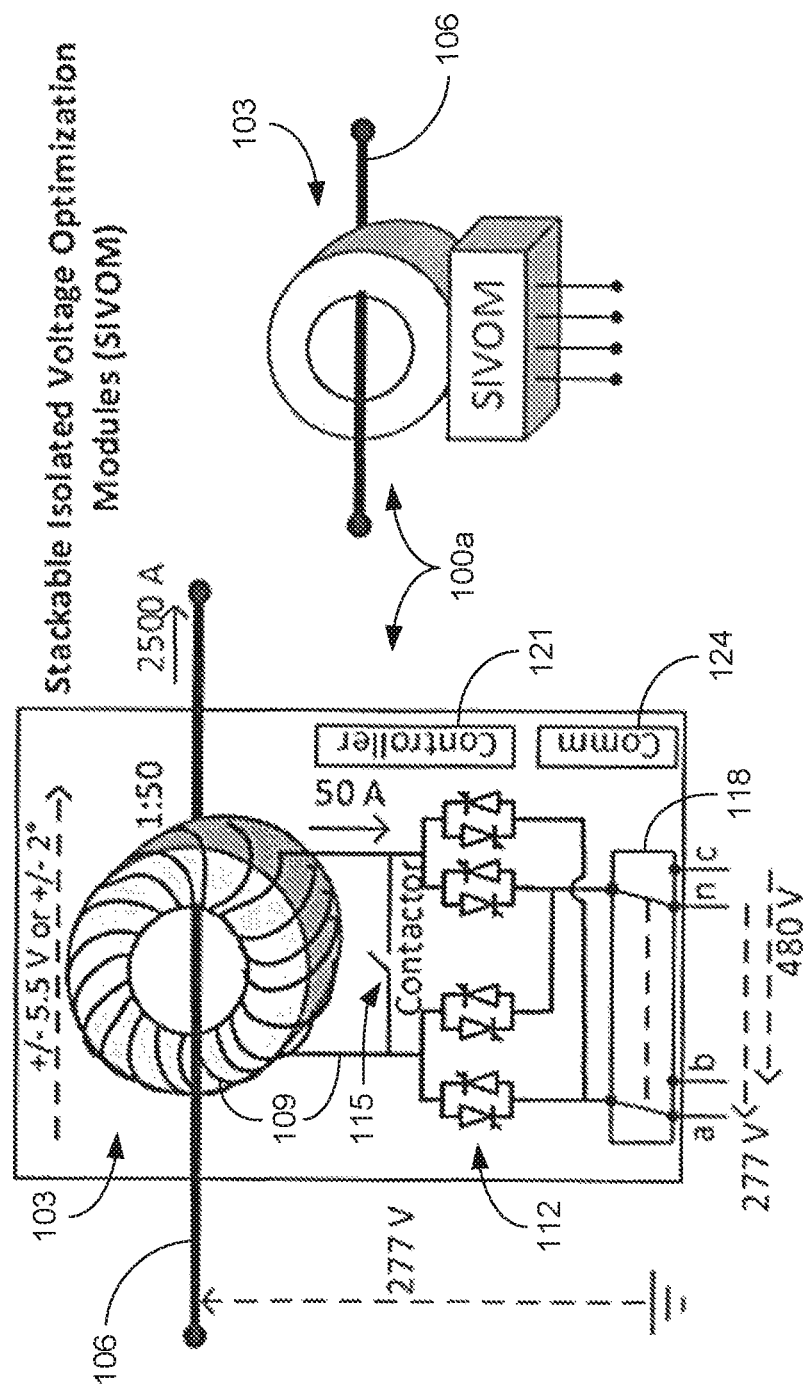
FIG. 1 is a schematic diagram illustrating an example of a stackable isolated voltage optimization modules (SIVOM), in accordance with various embodiments of the present disclosure.

Disclosed herein are various examples of methods, systems, apparatus and devices related to isolated voltage optimization. Reference will now be made in detail to the description of the embodiments as illustrated in the drawings, wherein like reference numbers indicate like parts throughout the several views.

The feasibility of conventional solutions becomes particularly problematic when the objective is to reduce energy consumed or peak demand. Reducing line voltage to 95% of nominal using a tapped transformer keeps the voltage within the allowed ANSI band, and can reduce the demand and energy consumed by 5-7% of values at nominal voltage. Typical solutions would have between 2-4% losses, negating a substantial portion of the anticipated benefit.

Secondly, if the voltage is maintained at 95% of nominal, any voltage sag would further reduce the load voltage, jeopardizing uninterrupted operation of the process or sensitive equipment. In such a case, it would be important to maintain the voltage within the allowed band even as the incoming line voltage sees a voltage sag. This voltage correction would need to be rapid, occurring in less than a cycle of the line voltage to prevent process downtime. The use of power semiconductors to achieve a real-time response of 8 ms carries with it the penalty of higher losses, the need for advanced thermal management, and the need to manage the high currents that flow under system fault conditions.

Finally, to meet the demands of varied load systems, ranging from 1 MW to over 20 MW, the solutions would need to be custom designed to meet all needs, and would be very expensive. The challenges posed by the above constraints prove to be too difficult to overcome, and many industrial users do not use any fast voltage control and actually operate with transformer taps fixed at about 104% of nominal voltage to ensure continued operation of their processes even as the line voltage decreases to 90% or lower. This results in their paying 8-15% more for energy than they would if they were able to maintain the line voltage at 95% of nominal.

A more practical grid edge voltage optimization solution would have the following features:
- Losses of less than 0.3% of load power managed;
- The ability to scale from 1 MW to 20 MW or greater;
- The ability to handle up to 50 kA of short circuit current;
- +/−5% voltage control around a nominal set point;
- Fast sub-cycle response to ensure voltage sag resilience;
- Compact, passive cooling, easy installation, and no field servicing needed;
- The ability to work with existing power infrastructures;
- A fail-normal architecture that is highly robust and resilient;
- A payback of less than 2 years; and
- Smart, communications enabled, that allows integration with grid ancillary markets.

A common core technology platform is presented that addresses some of the biggest challenges, thereby making the solution suitable for several specific demanding applications.

The stackable isolated voltage optimization module (SIVOM) can provide a solution to these limitations. One or more of the SIVOM(s) can be used in a wide range of applications including, e.g., high power utility and industrial applications rated at, e.g., 208V, 480V, or 600V AC (3 phase), with currents from 1000 A to around 6000 A per circuit (0.36 MVA to SMVA), which is typically the limit for 480 Volt transformers. As an example, each SIVOM unit can be configured to provide voltage buck or boost of, e.g., +/−2% (or other appropriate range). Stacking three such SIVOM units can provide a range of +/−6% in the voltage control. The SIVOM unit can also be configured to inject out-of-phase voltage resulting in phase angle control of about 2-5 degrees. Each SIVOM unit can operate and can be controlled autonomously, but can also be coordinated using communications or line sensing to achieve specific system level objectives in a dispatch mode of operation.

Referring to FIG. 1, shown is an example of a stackable isolated voltage optimization module (SIVOM) 100a utilizing a toroidal transformer (TT) 103. As shown in FIG. 1, a main (or primary) conductor (or line) 106 passes through the core of the TT 103 to act as the primary winding, and the secondary winding 109 is wrapped around the core. The core can be a silicon steel core or other core that is equivalent or suitable for the application. The high current main conductor 106 passing through the core of the TT 103 acts as the primary winding with the secondary winding 109 wound around the core (e.g., 50 turns). If the current in the main (or primary) line 106 is 2500 Amperes, then with a turns ratio of 1:50 the current in the secondary winding is only 50 Amperes. As can be understood, the number of secondary winding turns can be varied to provide a turns ratio appropriate for the application.

The leads for the secondary winding 109 are connected to switching circuitry 112 as shown in FIG. 1. For example, a thyristor pair or a triac switch can be used to short the secondary winding 109, or to connect it to a corresponding line voltage of, e.g., 277 Volts. The SIVOM 100, and thus the switching circuitry 112, can be suitable for operation up to 600 Volts (or more). The switching circuitry 112 can also include a bypass relay or contactor 115 connected across the leads of the secondary winding 109. The operation of the switching circuitry 112 can effectively inject 5.5 volts into the primary line, effecting a change of about 2% in the line voltage on the main conductor 106. Depending on the polarity of the 'secondary' connection, the voltage could be increased or decreased. This can be achieved with, e.g., four thyristors in a bridge configuration as illustrated in FIG. 1. If the secondary winding 109 is connected across the other two phases, then an out-of-phase voltage of 9.6 V can be injected, resulting in phase angle control of about +/−2 degrees. The turn of the secondary winding 109 can be varied to achieve the desired amount of voltage and/or phase angle control.

A connection block 118 can be included that can switch between connection configurations. For instance, the connection block can comprise switching devices such as, e.g., relays, solid state switches, or other appropriate switching device that can be controlled to switch between phase and/or neutral connections. Manual switches or jumpers may also be used. In the example of FIG. 1, a first switching device can be switched between phase A and phase B and a second switching device can be switched between neutral N and phase C. The SIVOM 100a also comprises a communication interface 121 and a controller 124, which can include processing circuitry with a processor and memory and/or an application specific integrated circuit (ASIC). The controller 124 can be configured to control switching of the switching circuitry 112 and/or the connection block 118

Figure 2:
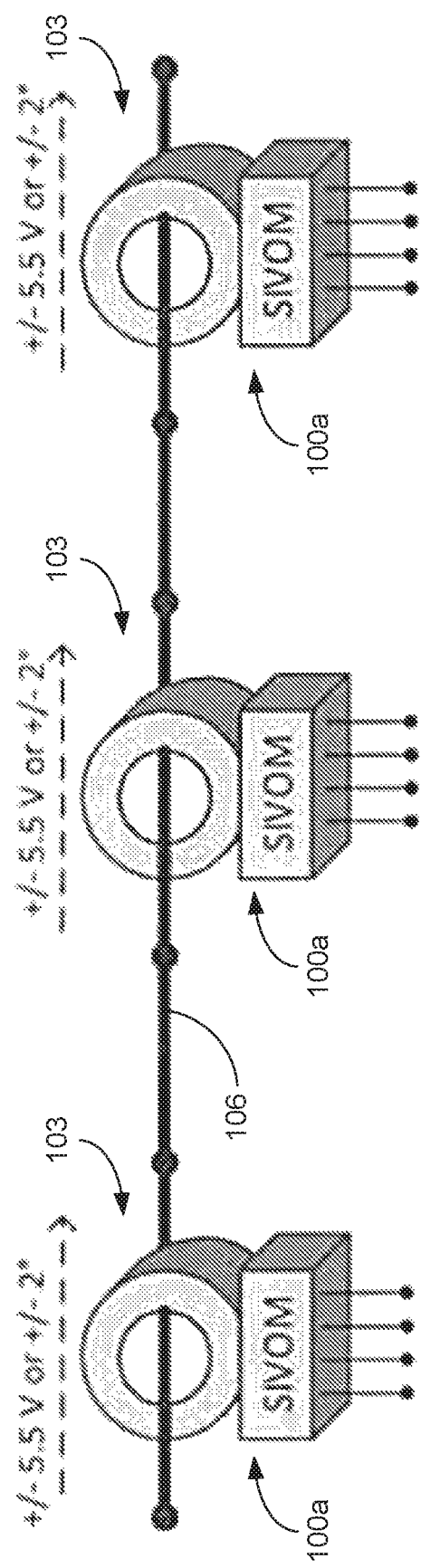
FIG. 2 is a schematic diagram illustrating an example of stacking of SIVOMs, in accordance with various embodiments of the present disclosure.

SIVOMs 100 can be can be stacked together to achieve a desired control result. FIG. 2 shows an example of three SIVOMs 100a stacked on a main (or primary) conductor (or line) 106. As shown, the main conductor 106 runs through the TTs 103 of all three SIVOMs 100a. In this arrangement, the range of the voltage control can be increased to about +/−6% of nominal and the range of the phase control can be about +/−6°. Further, the losses for this configuration are low, estimated to be around 1.25 kW or less than 0.2% of delivered power over 666 kW/phase (or 2 MW total). In the case of a system fault, a 50,000 A fault current would in principle be reduced to 1000 A, which is very manageable with available low-cost thryristors, especially if used with the bypass relay (or contactor) 115. If a SIVOM 100a fails, it can be configured to revert to a bypass mode where the bypass relay 115 closed. In this way, the functionality of the system is maintained, although with a reduced voltage control.

Figure 3A:
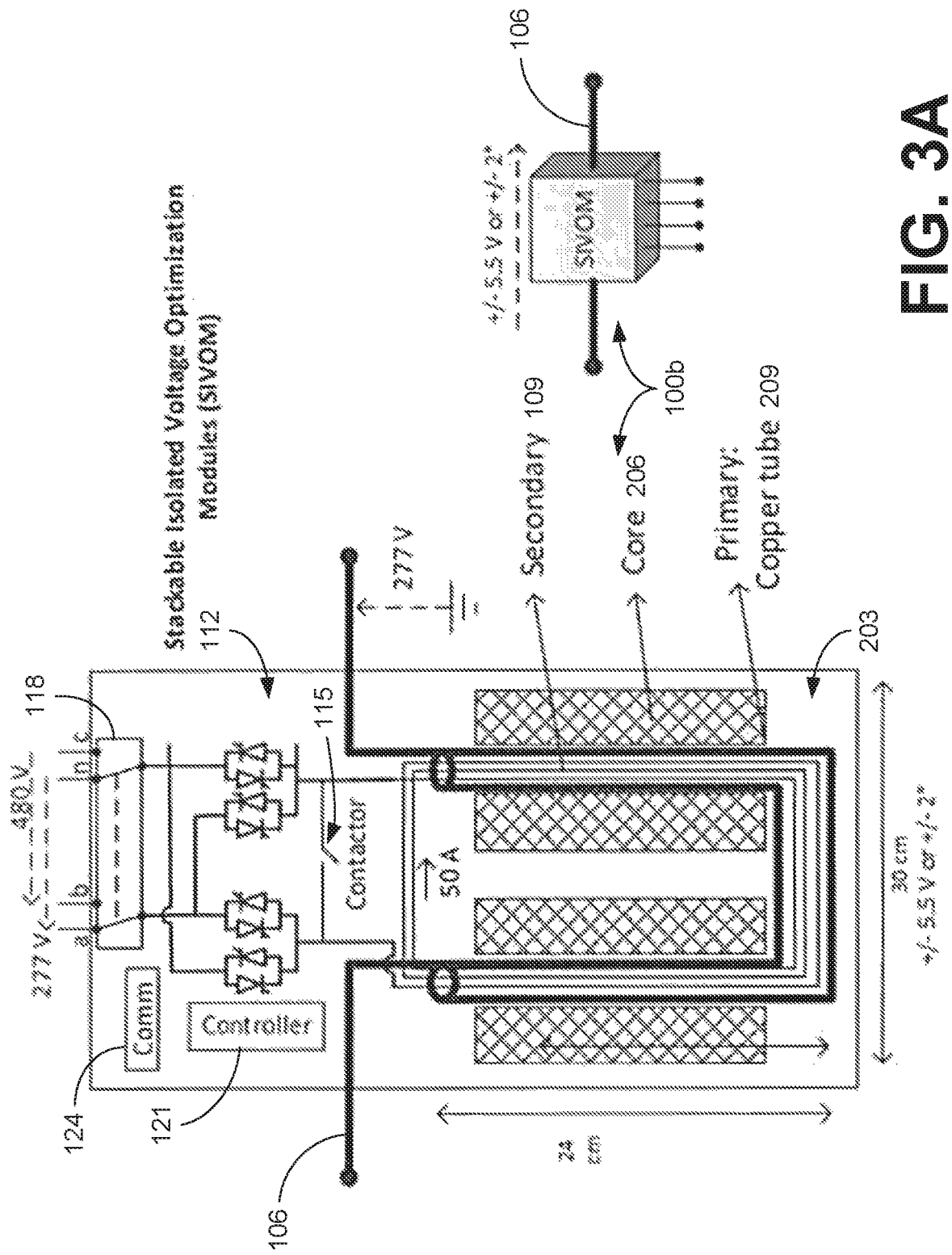
FIG. 3A is a schematic diagram illustrating an example of another SIVOM, in accordance with various embodiments of the present disclosure.

The high levels of leakage flux that can be present in toroidal transformers (TT) 103, and the high mechanical stresses between the primary and secondary windings when seeing fault currents, can be avoided by using a coaxial winding transformer. FIG. 3A shows an example of a stackable isolated voltage optimization module (SIVOM) 100b utilizing a coaxial winding transformer (CWT) 203. As illustrated in FIG. 3A, the turns of the secondary winding 109 are coaxially located with the main (or primary) conductor 106 in a core 206. The core 206 can be a silicon steel core or other core that is equivalent or suitable for the application. A U-shaped or oval-shaped tube 209 can provide the primary winding (and a portion of the main conductor 106) through connections at opposite ends. The U-shaped or oval-shaped tube 209 can be copper or other appropriate conductive material. The turns of the secondary winding 109 can pass through the inside the copper tube 209 (e.g., with a turns ratio of 1:50). This arrangement provides additional strength to withstand the forces generated by fault currents. The coaxial configuration also reduces the levels of leakage flux in the CWT 203.

Figure 3B:
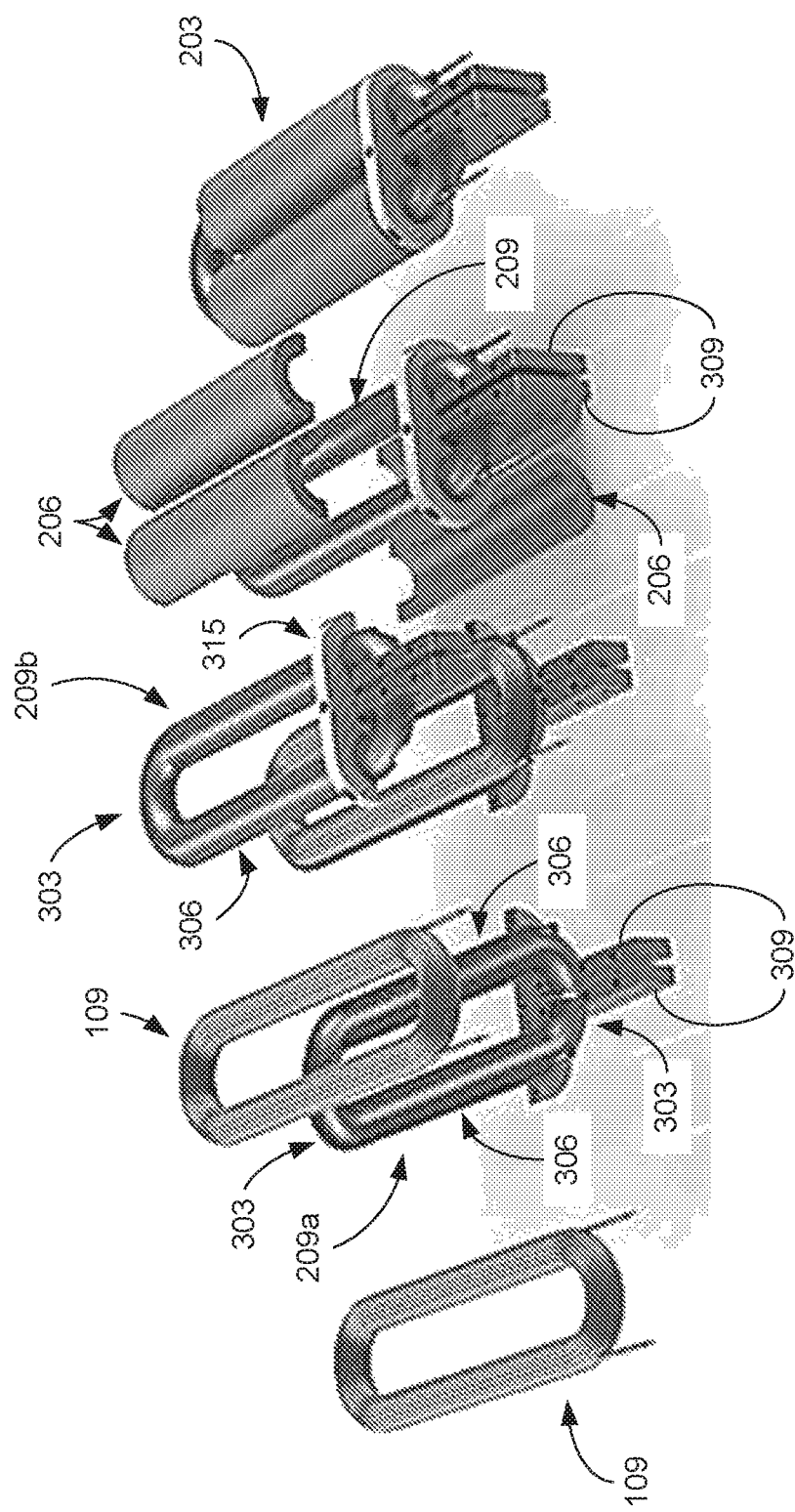
FIG. 3B is an image illustrating an example of the construction of a coaxially wound transformer (CWT), in accordance with various embodiments of the present disclosure.

Referring to FIG. 3B, shown is an example of a CWT 203 comprising an oval-shaped split tube as the primary winding. Initially, the oval-shaped split tube 209 can be fabricated. As can be seen in FIG. 3B, the oval-shaped tube 209 includes two straight sections 303 between rounded ends 306. The oval-shaped tube 209 is split along the length of the tube to facilitate insertion of the secondary winding between both halves 209a and 209b of the oval-shaped tube 209. In one of the rounded ends 306, the oval-shaped split tube 209 is cut to form a single-turn primary winding for the CWT 203. Connection plates 309 are mounted to both halves of the split tube 209a and 209b on opposite sides of the cut in the rounded end 306. As can be understood, the two halves of the oval-shaped tube 209a and 209b are mirror images of each other that can be positioned to form the completed oval-shaped split tube 209.

For assembly, a multi-turn winding can be formed for the secondary winding 109 of the CWT 203. The secondary winding 109 is placed in one half of the oval-shaped split tube 209a. The leads for the secondary winding can be passed through openings in one of the rounded ends 306 of one half of the oval-shaped split tube 209a. For example, openings can be formed on opposite sides of the cut end of the half tube 209a, with the connection plates 309 between the two openings. The secondary winding leads can pass through the openings for connection to the switching circuitry 112 (FIG. 3A). A protective sleeve can be provided around the leads passing through the openings to provide additional insulation and wear protection. With the winding 109 positioned in the half tube 209a, the other half tube 209b can be aligned over tube half 209a so that the secondary winding 109 is surrounded by the oval-shaped split tube 209. The connection plates 309 of each tube half can be configured to attach together to hold the halves of the oval-shaped split tube 209 in alignment around the secondary winding 109. For example, corresponding connection plates 309 can be secured together using fasteners (e.g., bolts or screws).

Mounting braces 315 can also be included to hold the oval-shaped split tube 209 in alignment and secure the cores 206 around the straight sections 303 of the oval-shaped split tube 209. The mounting braces 315 can be made from insulating material with sufficient strength to hold the cores 206 in position on the oval-shaped split tube 209. The mounting braces 315 can be fixed in position at both ends of the cores 206 using fasteners (e.g., nuts and bolts) extending through the center and outside both sides of the oval-shaped split tube 209 to secure two halves together. The construction of the CWT 209 allows it to be immersed in oil for cooling during operations. Holes or openings can be provided in the tube 209 to allow oil to flow inside the tube 209 around the secondary winding 109. The arrangement of the oval-shaped split tube 209 also provides additional structural support to withstand the forces produced by fault currents flowing through the CWT 203.

Similar to the TT 103 of the SIVOM 100a in FIG. 1, the leads for the secondary winding 109 of the CWT 203 are connected to switching circuitry 112 (e.g., a thyristor pair or a triac switch) as shown in FIG. 3A. The switching circuitry 112 can also include a bypass relay (or contactor) 115 connected across the leads of the secondary winding 109. A connection block 118 can be included that can switch between connection configurations. The SIVOM 100b also comprises the communication interface 121 and the controller 124.

Figure 4A:
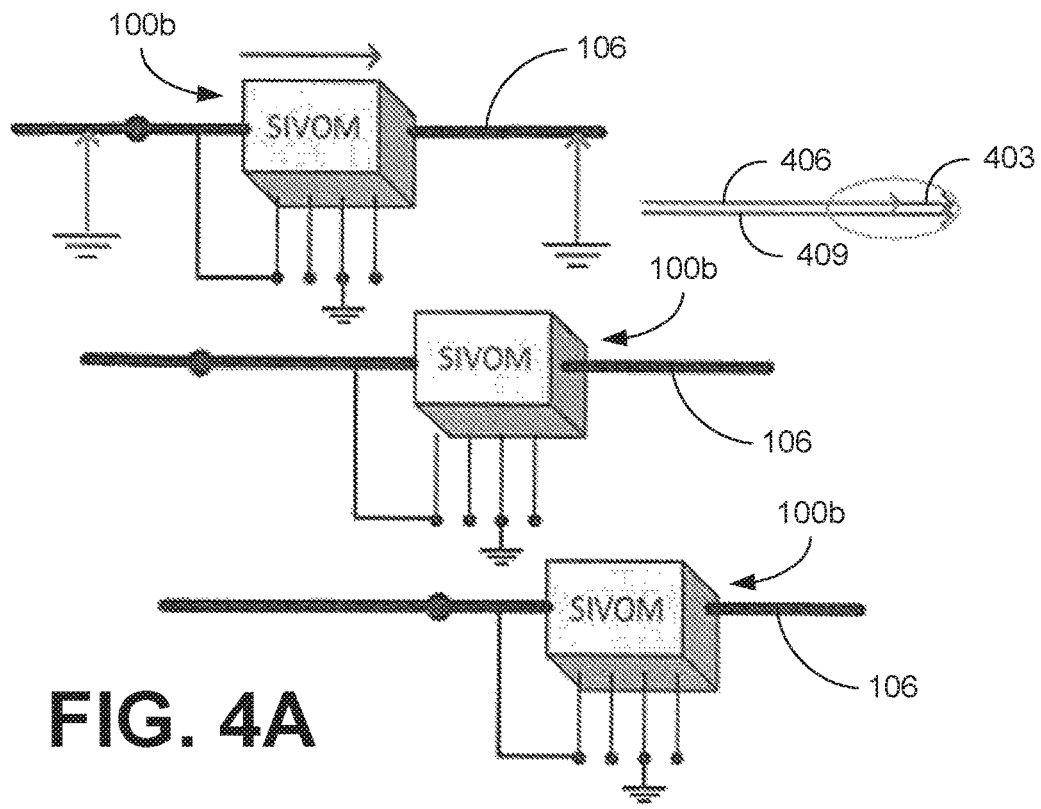
FIGS. 4A through 4C are schematic diagrams illustrating examples of voltage and/or power flow control using one or more SIVOM, in accordance with various embodiments of the present disclosure.
Figure 4B:
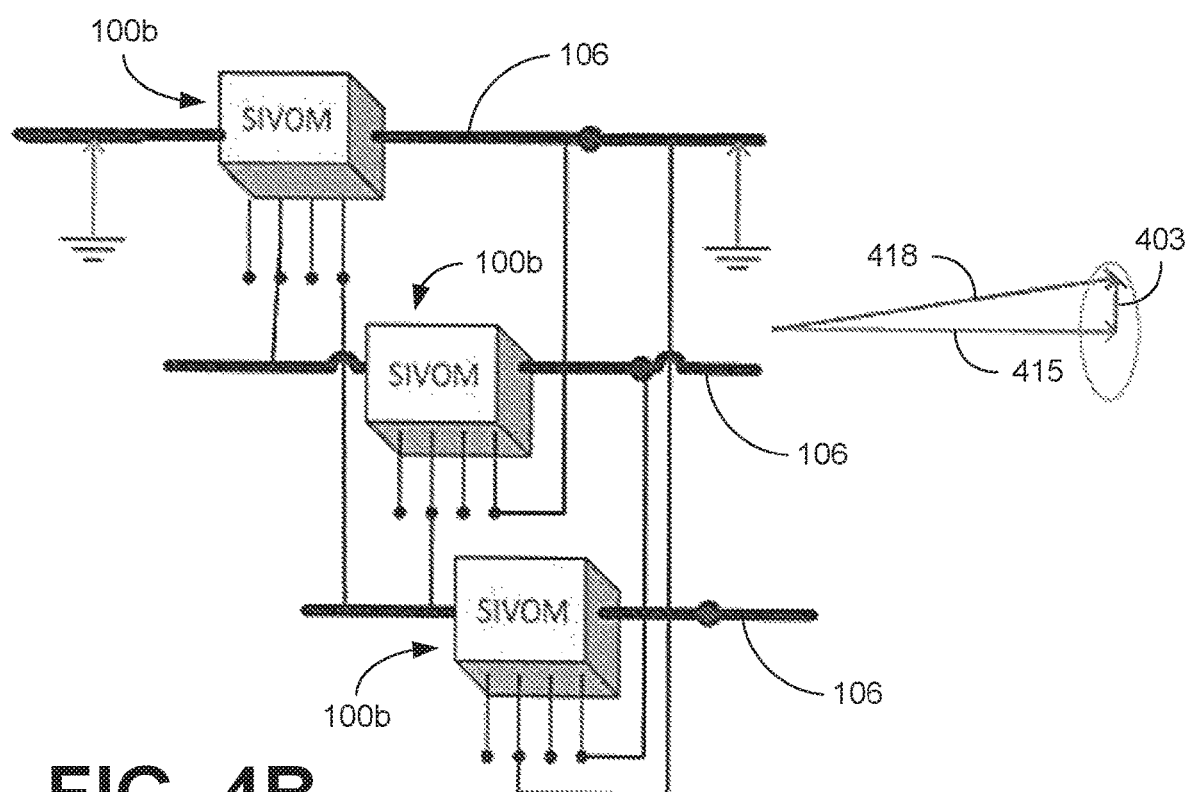
Figure 4C:
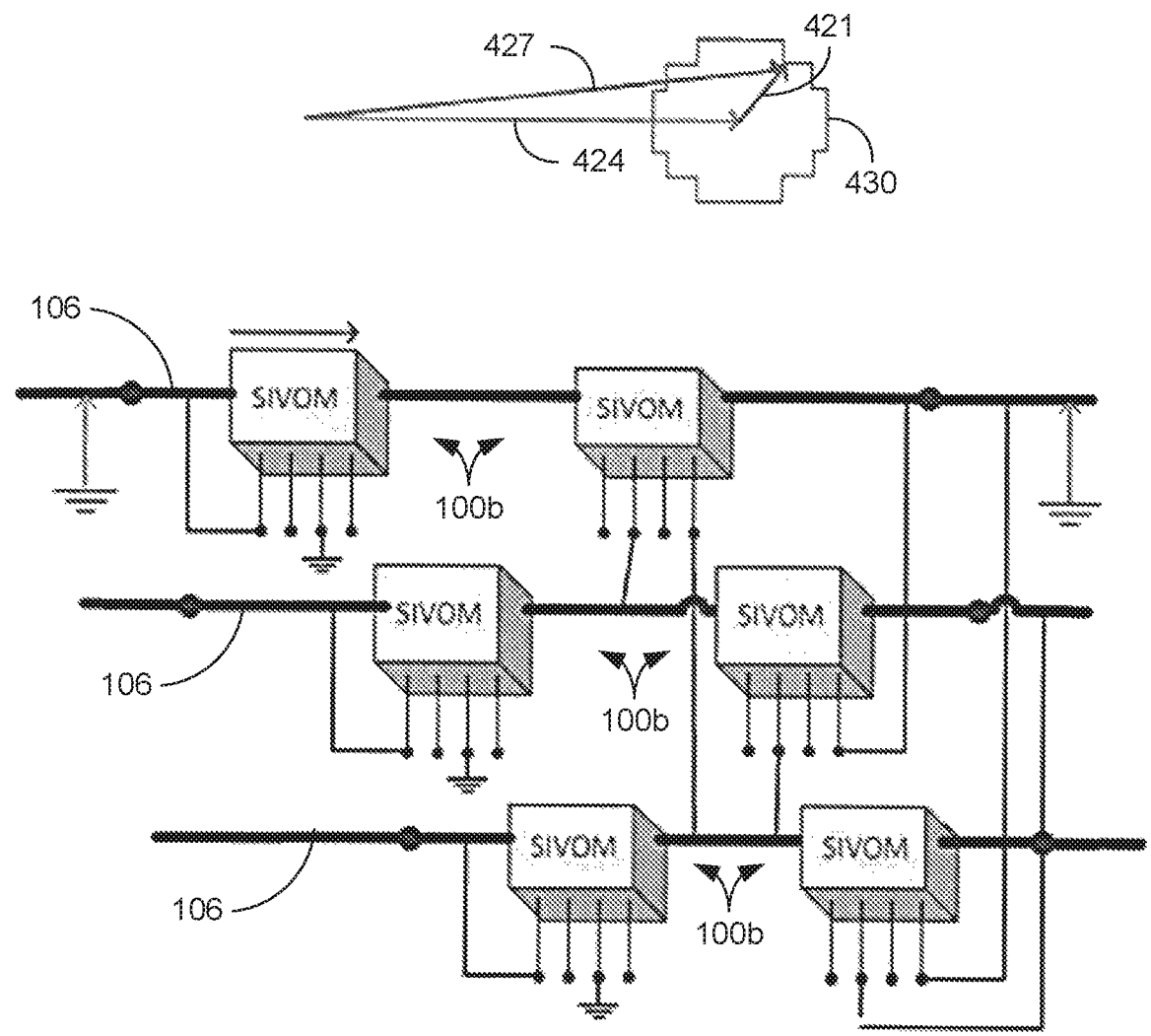

Referring next to FIGS. 4A-4C, shown are schematic diagrams illustrating examples of voltage and/or power flow control using one or more SIVOM 100. A SIVOM 100, or stacked SIVOM 100, can be excited with the line-neutral voltage of the phase that it is mounted on. For example, as shown in FIG. 4A, the secondary winding 109 of the SIVOM 100b is connected between the main (or primary) conductor (or line) 106, which is connected to the primary winding of the CVVT 203, and a neutral connection. This will achieve voltage control for that phase as illustrated by the phasor diagram in FIG. 4A. Since the secondary winging 209 is excited by the voltage on the main conductor 106, the voltage coupled from the secondary winding 109 to the main conductor 109 (phasor 403) is in phase (or 180 degrees out of phase) with the voltage on the main conductor 106 (phasor 406) is additive to produce an adjusted output voltage (phasor 409). In radial applications, this will allow precise buck and boost voltage control by the SIVOM 100 enabling applications such as energy control and peak demand management. The applied voltage may be adjusted through control of the switching circuit 112. The currents and voltages of the SIVOM 100 can be monitored by the controller and used to control the operation of the switches. For example, the thyristors may be switched to provide excitation over only a portion of the cycle (e.g., half cycle switching). The input and output thyristors will need to be operated so that they are not both open or shorted at the same time. As discussed with respect to FIG. 2, multiple SIVOMs 100 can be stacked to provide a desired voltage control.

If a SIVOM 100 is excited with the opposing line-line voltage as shown in FIG. 4B (e.g., the secondary winding 109 of the SIVOM 100b is connected across the main conductors of phases B-C for the SIVOM 100b with the primary winding connected to the main conductor 106 of phase A, a quadrature voltage is injected as illustrated in the phasor diagram. Since the injected voltage (phasor 412) is 90 degrees out of phase with the voltage on the main conductor 106 (phasor 415), the two voltages combine to produce a phase shift in the adjusted output voltage (phasor 418). This allows the SIVOM 100 to function as a power router, changing the power in the upstream transformer relative to other transformers connected to the low-voltage meshed network. As discussed with respect to FIG. 2, multiple SIVOMs 100 can be stacked to provide a desired power flow control.

Referring next to FIG. 4C, both the voltage control and power flow control can be achieved by implementing the configuration shown. In the example of FIG. 4C, each phase includes two stacked SIVOMs 100b, with a first SIVOM 100b configured as illustrated in FIG. 4A and the second SIVOM 100b configured as illustrated in FIG. 4B. The combination of SIVOMs 100b, as illustrated in the example FIG. 4C, can be configured to operate in a voltage buck-boost mode, in a power flow control mode, or a combination of both depending on the desired functionality. This can be seen in the phasor diagram of FIG. 4C. The combination of voltages (phasor 421) injected by the SIVOMs 100b combine with the voltage on the main conductor 106 (phasor 424) to produce a desired voltage and/or power flow adjustment (phasor 427). As illustrated by the control envelope 430, a pseudo step-wise control can be implemented using a combination of SIVOMs 100. As discussed with respect to FIG. 2, multiple SIVOMs 100 can be stacked to provide a desired voltage and/or power flow control. By adjusting the turns ratio of the TT 103 or CWT 203, and the number of stacked SIVOMs 100, it is possible to customize the shape of the control envelope 430. This arrangement provides a unique grid balancing function where the meshed system can be fully loaded and system capacity can be maximized.

Figure 5:
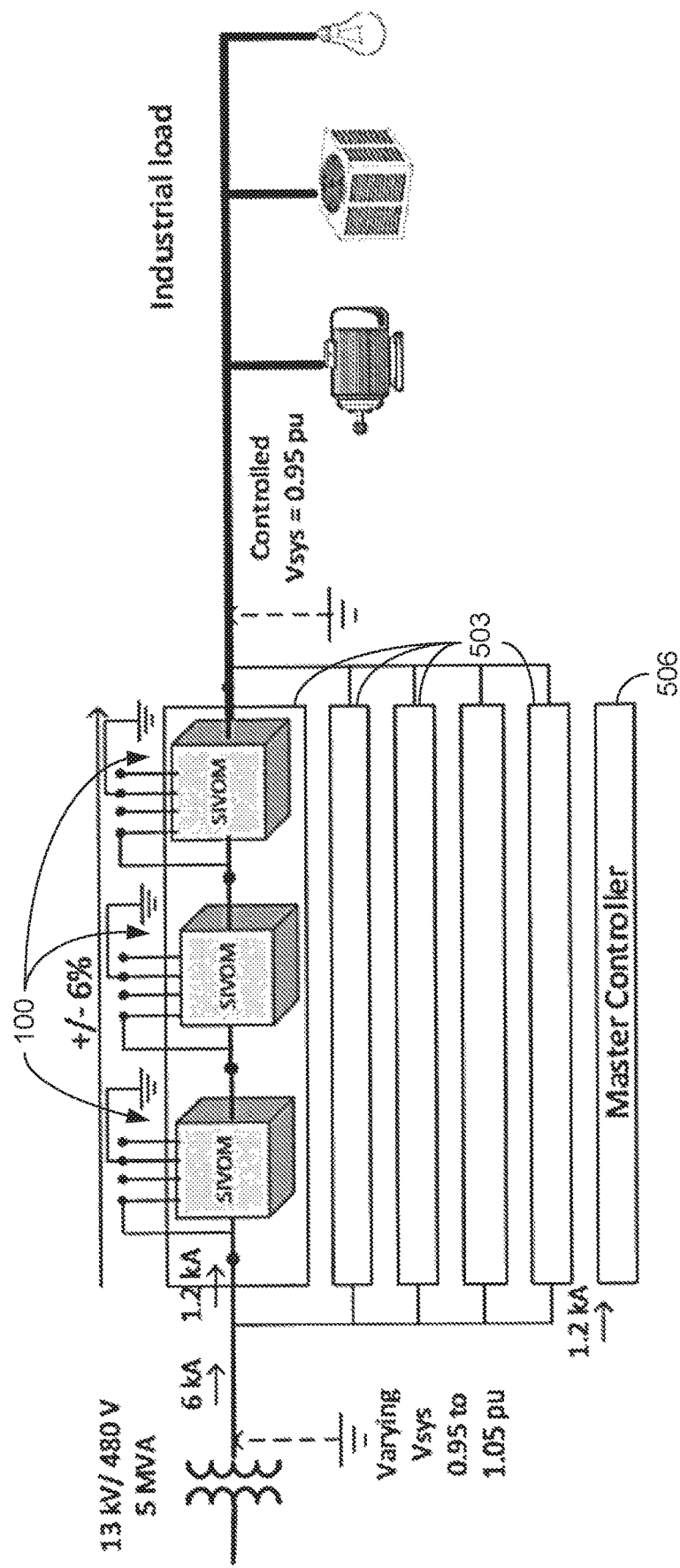
FIGS. 5 and 6 are schematic diagrams illustrating examples of applications utilizing SIVOMs to control voltage and/or power flow, in accordance with various embodiments of the present disclosure.

The SIVOMs 100 can be used in a wide variety of industrial, utility and other applications. A first application is for large industrial plants (e.g., 1-20 MW) that are fed from 480 volt supply, and where dynamic voltage control is desirable. As shown in FIG. 5, this can be achieved with one or more groups 503 of stacked SIVOMs 100 per phase to achieve a wider control range over the voltage. A master controller 506 can communicate with the SIVOMs 100 via the communication interfaces 124 to provide coordinated operation. For example, the system can be set to operate at a defined output voltage or output voltage range (after the stacked SIVOMs 100) such as, e.g., the lower end of the allowed ANSI band (e.g., 0.95 per unit (pu) of the nominal voltage). The master controller 506 can monitor the output voltage level (or phase angle) and adjust the operation of the SIVOMs 100 in response to changes in the output voltage level. The output voltage can be regulated even as the incoming line voltage varies over its normal range, especially if it goes below the ANSI limits. In such a case, the SIVOMs 100 can rapidly boost the voltage to maintain the desired output voltage level. The switching circuitry 112 (FIGS. 1 and 3) can be configured to provide response times within a cycle.

For example, consider the situation illustrated in FIG. 5 where three SIVOMs 100 are stacked to provide about +/−6% voltage control for each phase. In this case, the incoming line voltage could go as low as 89% of nominal, while still ensuring that the output voltage is within the allowed range. To achieve the same level of sag susceptibility with a fixed transformer tap, the main transformer would have to boost the voltage by 5-6%, giving a nominal voltage of 105% in the plant. While this would provide an equivalent resilience against sags, it would result in 10-15% increase in energy consumption and peak demand charges. The SIVOMs 100 can be added retroactively (e.g., in the electrical room) of an existing facility and can provide substantial reduction in energy costs while maintaining a high level of resiliency against voltage sags and low voltage conditions. Using the SIVOMs 100 can also double the operating range of the incoming line voltage to 89% to 111% of nominal while ensuring that the plant voltage is in the +/−5% band desired.

Figure 6:
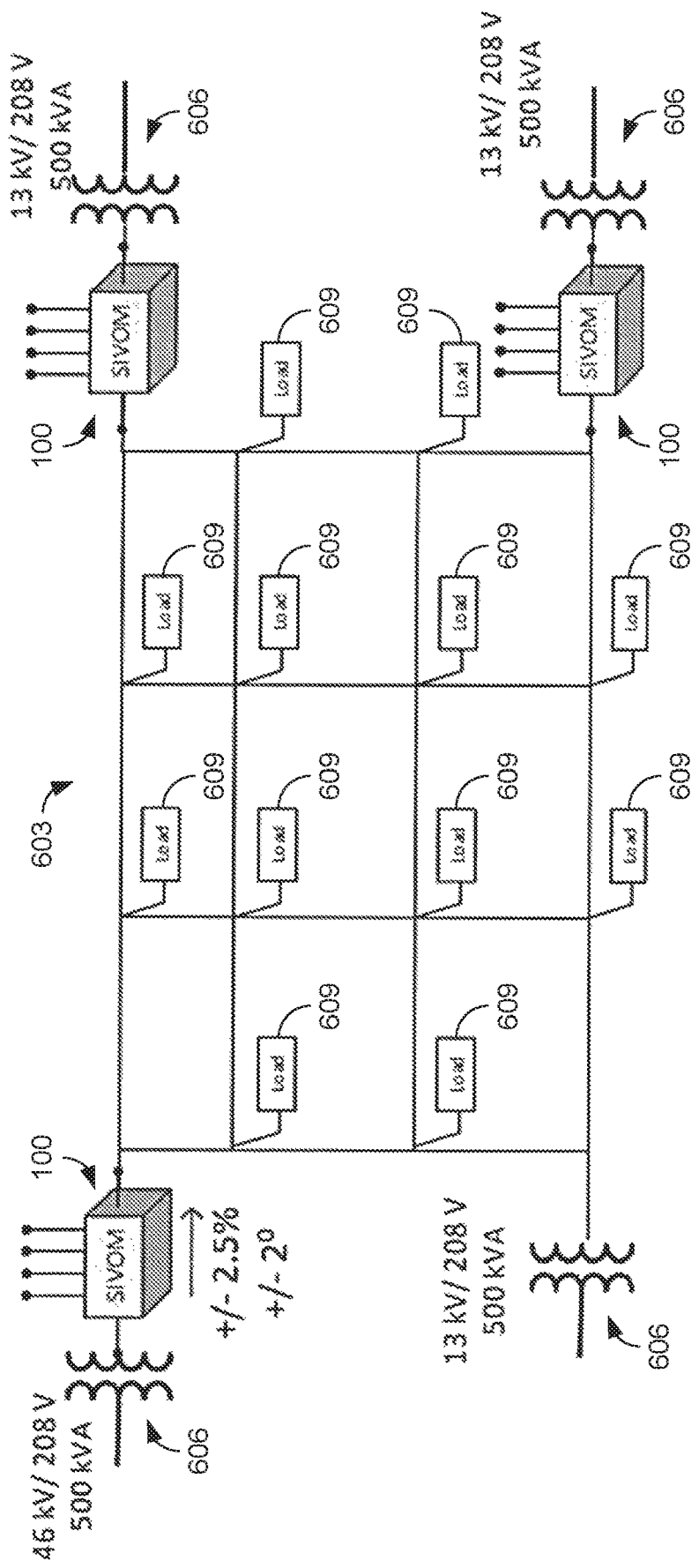

Another application is in large low-voltage meshed AC power systems, such as in New York City where individual sub-grids are rated at 208V/120V at less than 20 MW. FIG. 6 illustrates an example of a meshed grid 603 that is supplied through four power transformers 606, which can be rated at, e.g., 0.5-1 MW each. Loads 609 can be connected to the meshed grid 603 at any of a number of locations. The ability to operate with N-X levels of redundancy result in extremely high levels of reliability. On the other hand, load variations and grid impedances cause uneven loading of the transformers, significantly limiting the capacity of the overall system. By including SIVOMs 100 at the outputs of at least a portion of the transformers 606, the SIVOMs 100 can dynamically balance the loading of the transformers 606 and unlock significant capacity. This is a distributed application where multiple transformers can incorporate the SIVOMs 100. For instance, just three SIVOMs 100 (one per phase) per transformer 606 may be sufficient to meet overall grid balancing objectives.

Another application includes green-field industrial plants where a low-voltage (480 volt) meshed grid supplied by multiple SIVOM enabled transformers could be used to feed the electrical needs of the plant. Unprecedented levels of reliability and flexibility may be provided in this way, allowing loads to be moved as needed, and allowing additional capacity to be connected as demand is increases or changes over time. This approach can simultaneously achieve the objectives of reliability, energy cost reduction and improved asset utilization. The inability to control power flows in meshed systems has forced the use of radial networks, with reduced flexibility and reliability, which can be overcome through the use of SIVOMs 100.

Figure 7A:
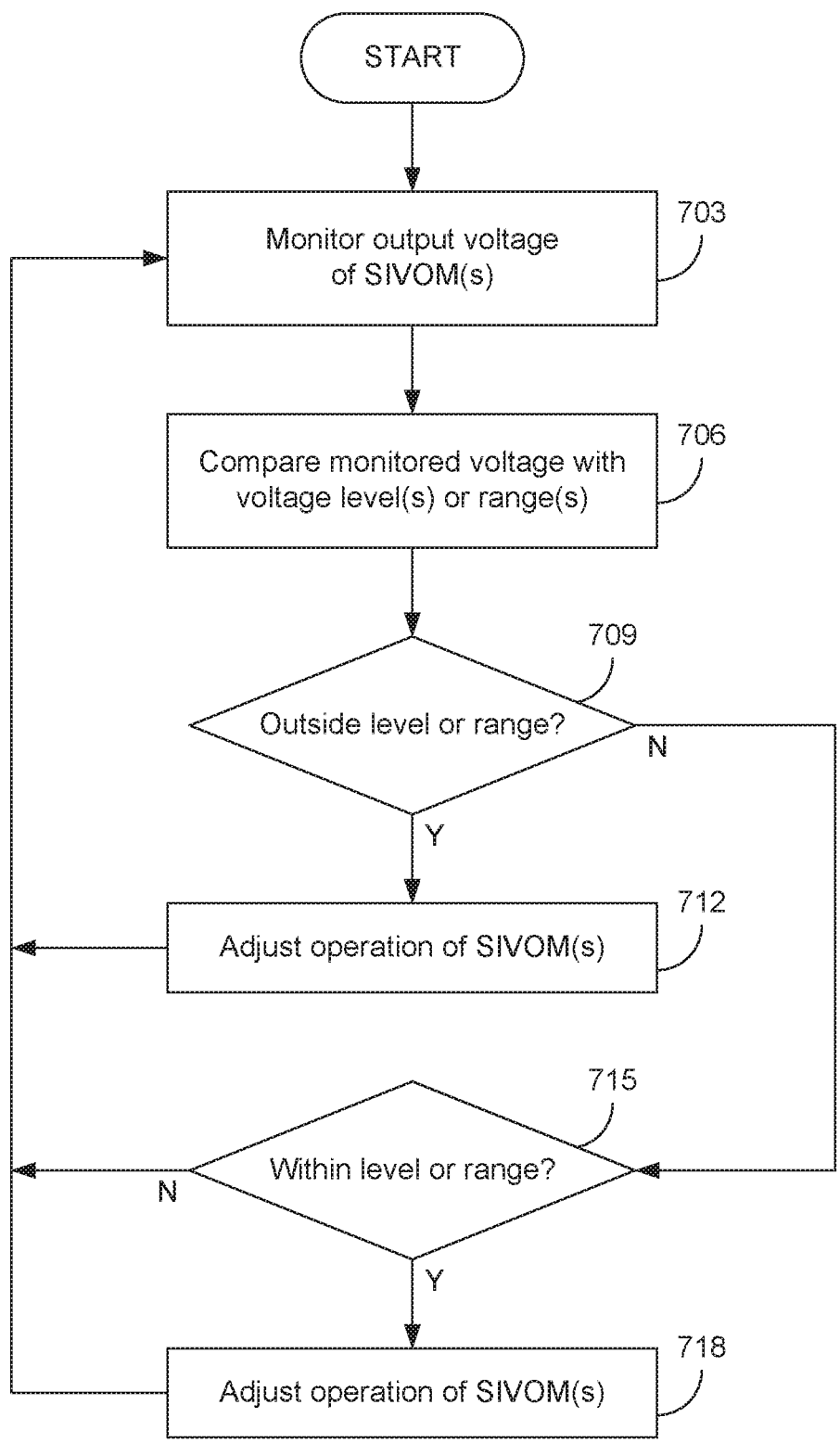
FIGS. 7A and 7B are flow diagrams illustrating an example of the operation of a SIVOM, in accordance with various embodiments of the present disclosure.

Referring to FIG. 7A, shown is a flow diagram illustrating an example of the operation of the SIVOMs. Beginning at 703, the output voltage(s) of the SIVOM(s) 100 are monitored for magnitude (or level) and phase angle. The controller 121 of a SIVOM 100 (FIGS. 1 and 3) can monitor the output of itself to control switching of the switching circuit 112, or a master controller 506 (FIG. 5) can monitor the output(s) of one or more SIVOM(s) 100. At 706, the monitored voltage can be compared to one or more defined voltage levels or ranges to determine operation of the individual SIVOM(s) 100. In response to the comparison, the switching circuitry 112 and/or connection block 118 can be operated to adjust operation of SIVOM(s) 100. If the monitored voltage is outside the defined level or range at 709, then operation of the SIVOM (or a plurality of SIVOMs) 100 can be adjusted at 712 and the flow return to 703 where the monitoring continues. If the monitored voltage is not outside the desired level or range, then it can be determined at 715 if the voltage level has returned to within the level or range allowing the operation of the SIVOM (or SIVOMs) 100 to be adjusted at 718. If not then the flow returns to 703 to continue monitoring. The monitoring cycle can be carried out at defined time intervals (e.g., every t seconds). Stacked SIVOMs 100 can have randomly assigned time intervals (t) to avoid hunting between the different SIVOMs 100.

Figure 7B:
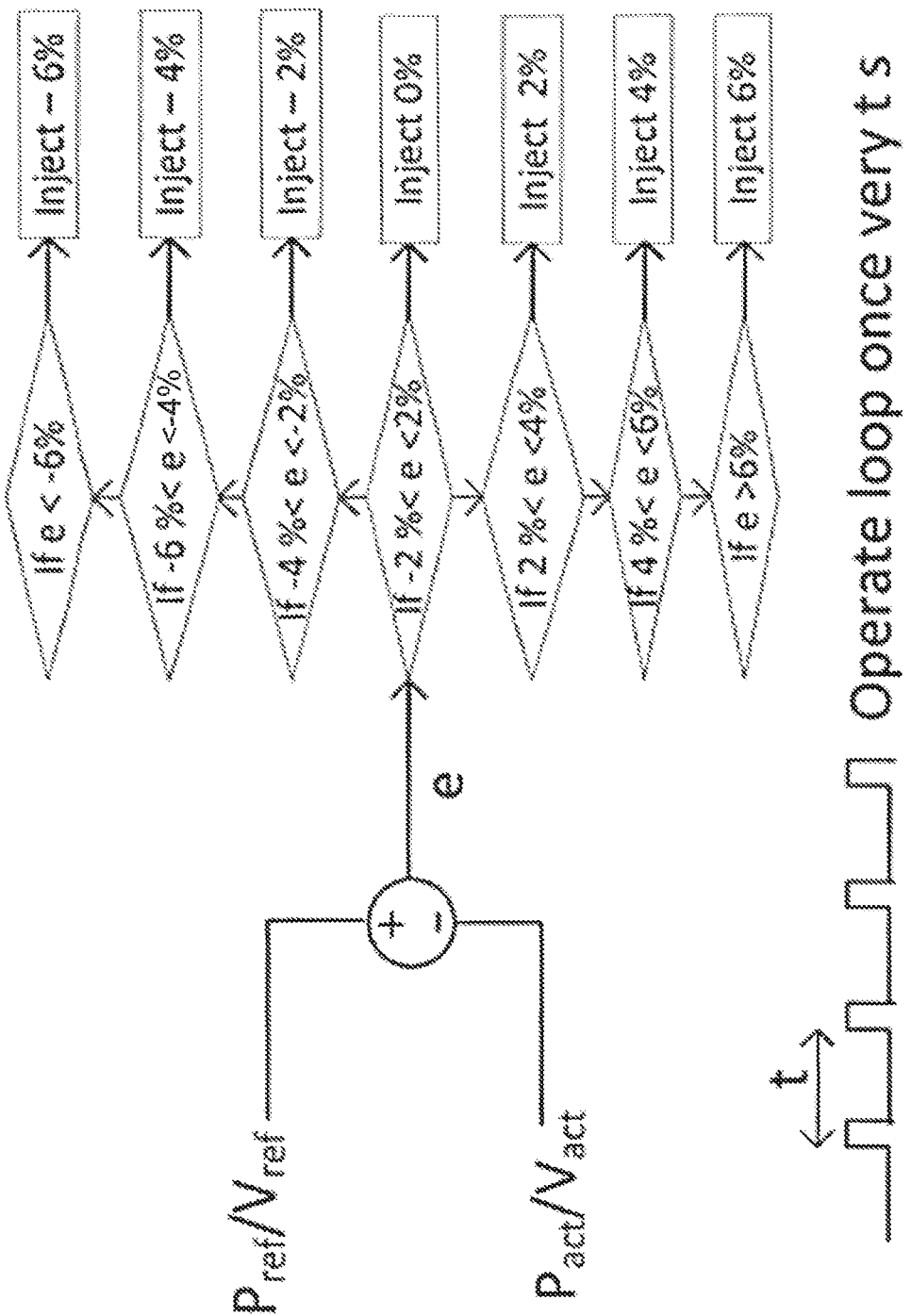

FIG. 7B illustrates an example of the operation adjustment based upon the examples of FIGS. 2 and 5, where the SIVOMs 100 can individually adjust the voltage or the phase angle in increments of about 2%. The SIVOM unit will adjust the amount of injection based on the magnitude of error between the desired and the actual value. As shown in FIG. 7B, comparison of the monitored voltage magnitude or phase angle to the levels or ranges can result in appropriate adjustment of one or more SIVOM(s) 100. In the described embodiments, the disclosed SIVOMs 100 are configured to provide changes in about 2% increments. For example, if the error (e) between reference and actual values is within +1-2%, then no adjustment is made. If the error (e.g., $V_{ref}-V_{act}$) is outside that range, then the actual voltage or phase is adjusted by one or more SIVOM 100 as indicated.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The term "substantially" is meant to permit deviations from the descriptive term that don't negatively impact the intended purpose. Descriptive terms are implicitly understood to be modified by the word substantially, even if the term is not explicitly modified by the word substantially.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

Therefore, at least the following is claimed:

1. A stackable isolated voltage optimization module (SIVOM), comprising:
    a transformer having a turns ratio between a primary winding and a secondary winding of the transformer, where the primary winding is configured to be supplied by a first phase of a three-phase power system;
    a switching circuit configured to energize the secondary winding with a voltage provided from the three-phase power system or short the secondary winding; and
    a connection block configured to couple the switching circuitry to the first phase and a neutral of the three-phase power system, or to second and third phases of the three-phase power system, wherein energizing the secondary winding with a voltage from the first phase and the neutral of the three-phase power system boosts or bucks the voltage of the first phase without affecting phase angle of the first phase.

2. The SIVOM of claim 1, wherein the voltage boost or buck is based upon the turns ratio of the transformer and a polarity of the connection to the second and third phases of the three-phase power system.

3. The SIVOM of claim 1, wherein energizing the secondary winding with a voltage from the second and third phases of the three-phase power system adjusts power flow by changing the phase angle of the first phase.

4. The SIVOM of claim 3, wherein the voltage from the second and third phases is 90 degrees out of phase with a voltage of the first phase.

5. The SIVOM of claim 1, wherein the transformer is a coaxial winding transformer (CWT).

6. The SIVOM of claim 5, wherein the primary winding of the CWT comprises an oval-shaped split-tube configured to be connected to the first phase, and turns of the secondary winding are disposed within the oval-shaped split-tube.

7. The SIVOM of claim 1, wherein the transformer is a toroidal transformer (TT) with the primary winding comprising a main conductor passing through a toroidal core and the secondary winding comprising turns wrapped around the toroidal core.

8. The SIVOM of claim 1, wherein the switching circuit comprises thyristors in a bridge configuration.

9. The SIVOM of claim 1, further comprising a controller configured to control switching of the switching circuitry to energize the secondary winding.

10. The SIVOM of claim 9, wherein the controller is further configured to control switching of the connection block to couple the switching circuitry to the first phase and neutral of the three-phase power system, or to the second and third phases of the three-phase power system.

11. A system, comprising:
a plurality of stackable isolated voltage optimization modules (SIVOM) comprising a first SIVOM coupled to a first phase of a three-phase power system, a second SIVOM coupled to a second phase of the three-phase power system, and a third SIVOM coupled to a third phase of the three-phase power system, where each of the first, second and third SIVOMs comprises:
a transformer comprising a primary winding supplied by the first, second or third phase coupled to that SIVOM and a secondary winding; and
a switching circuit configured to boost or buck a voltage or change a phase angle of the phase coupled to that SIVOM by energizing the secondary winding of the transformer with a voltage provided from the three-phase power system, wherein:
energizing the secondary winding of the first SIVOM with a voltage from the first phase and a neutral of the three-phase power system boosts or bucks the voltage of the first phase without affecting phase angle of the first phase;
energizing the secondary winding of the second SIVOM with a voltage from the second phase and the neutral of the three-phase power system boosts or bucks the voltage of the second phase without affecting phase angle of the second phase; and
energizing the secondary winding of the third SIVOM with a voltage from the third phase and the neutral of the three-phase power system boosts or bucks the voltage of the third phase without affecting phase angle of the third phase.

12. The system of claim 11, wherein the three-phase power system is an output of a transformer supplying a meshed grid.

13. The system of claim 11, wherein the transformer is a coaxial winding transformer (CWT) comprising an oval-shaped split copper tube forming the primary winding, where the secondary winding comprises a multi-turn winding surrounded by the oval-shaped split copper tube.

14. The system of claim 11, wherein energizing the secondary winding of the first SIVOM with a voltage from the second and third phases of the three-phase power system changes the phase angle of the first phase;
energizing the secondary winding of the second SIVOM with a voltage from the first and third phases of the three-phase power system changes the phase angle of the second phase; and
energizing the secondary winding of the third SIVOM with a voltage from the first and second phases of the three-phase power system changes the phase angle of the third phase.

15. A system, comprising:
a plurality of stackable isolated voltage optimization modules (SIVOMs) comprising a first SIVOM coupled to a first phase of a three-phase power system, a second SIVOM coupled to a second phase of the three-phase power system, and a third SIVOM coupled to a third phase of the three-phase power system, where each of the first, second and third SIVOMs comprises:
a transformer comprising a primary winding supplied by the first, second or third phase coupled to that SIVOM and a secondary winding; and
a switching circuit configured to boost or buck a voltage or change a phase angle of the phase coupled to that SIVOM by energizing the secondary winding of the transformer with a voltage provided from the three-phase power system, wherein:
the switching circuit of the first SIVOM is coupled to the second and third phases of the three-phase power system to change the phase angle of the first phase supplying the primary winding;
the switching circuit of the second SIVOM is coupled to the first and third phases of the three-phase power system to change the phase angle of the second phase supplying the primary winding; and
the switching circuit of the third SIVOM is coupled to the first and second phases of the three-phase power system to change the phase angle of the third phase supplying the primary winding.

16. The system of claim 15, wherein the plurality of SIVOMs comprises a fourth SIVOM coupled to the first phase, a fifth SIVOM coupled to the second phase, and a sixth SIVOM coupled to the third phase of the three-phase power system, wherein the fourth, fifth or sixth SIVOMs boosts or bucks the voltage of the first, second or third phase.

17. The system of claim 15, comprising a first plurality of stacked SIVOMs coupled to the first phase, a second plurality of stacked SIVOMs coupled to the second phase, and a third plurality of stacked SIVOMs coupled to the third phase of the three-phase power system, wherein the first, second and third pluralities of stacked SIVOMs are configured to cumulatively boost or buck the voltage or change the phase angle of the first, second and third phase.

18. The system of claim 17, further comprising a master controller configured to maintain output voltages of the first, second and third pluralities of stacked SIVOMs by individually controlling operation of the stacked SIVOMs.

19. The system of claim 17, wherein the three-phase power system is an output of a transformer supplying industrial loads.

20. The system of claim 15, wherein the transformer is a coaxial winding transformer (CWT) comprising an oval-shaped split copper tube forming the primary winding, where the secondary winding comprises a multi-turn winding surrounded by the oval-shaped split copper tube.

* * * * *